(12) United States Patent
Weng et al.

(10) Patent No.: US 8,893,741 B2
(45) Date of Patent: Nov. 25, 2014

(54) PRESSURE RELIEF VALVE

(71) Applicants: Chen-Yuan Weng, Kaohsiung (TW); Chin-Sheng Ho, Taichung (TW)

(72) Inventors: Chen-Yuan Weng, Kaohsiung (TW); Chin-Sheng Ho, Taichung (TW)

( * ) Notice: Subject to any disclaimer, the term of this patent is extended or adjusted under 35 U.S.C. 154(b) by 212 days.

(21) Appl. No.: 13/688,236

(22) Filed: Nov. 29, 2012

(65) Prior Publication Data
US 2014/0144525 A1  May 29, 2014

(51) Int. Cl.
*F16K 15/20* (2006.01)
*F16K 15/00* (2006.01)
*F04B 53/10* (2006.01)
*F04B 33/00* (2006.01)

(52) U.S. Cl.
CPC .............. *F16K 15/00* (2013.01); *F16K 15/207* (2013.01); *F04B 53/10* (2013.01); *F04B 33/00* (2013.01)
USPC .......................................... 137/224; 137/542

(58) Field of Classification Search
USPC ................ 137/224, 228, 115.13, 542, 543.13
See application file for complete search history.

(56) References Cited

U.S. PATENT DOCUMENTS

| | | | | |
|---|---|---|---|---|
| 469,853 A * | 3/1892 | Gibson | ....................... | 137/243.2 |
| 1,270,952 A * | 7/1918 | Jones | ............................ | 137/224 |
| 1,482,517 A * | 2/1924 | Kelsey | ........................... | 137/224 |
| 1,503,180 A * | 7/1924 | Windish | ........................ | 137/224 |
| 1,722,345 A * | 7/1929 | Thune | ........................... | 137/224 |
| 1,727,474 A * | 9/1929 | Julius | ............................. | 137/224 |
| 1,753,118 A * | 4/1930 | Johansson et al. | ............. | 137/224 |
| 1,785,271 A * | 12/1930 | Lemex | ........................ | 137/515.5 |
| 1,833,218 A * | 11/1931 | Kelsey | ........................... | 137/540 |
| 1,850,111 A * | 3/1932 | Kelsey | ........................... | 137/224 |
| 1,985,759 A * | 12/1934 | Baumgartner | ................. | 137/224 |
| 2,015,882 A * | 10/1935 | Brewer | ......................... | 137/224 |
| 3,063,463 A * | 11/1962 | Gfoll | ............................. | 137/228 |
| 3,756,273 A * | 9/1973 | Hengesbach | ................. | 137/540 |
| 5,613,515 A * | 3/1997 | Huang | ........................... | 137/224 |
| 7,191,796 B1 * | 3/2007 | Rehmert, Jr. | ................ | 137/512.1 |
| 2009/0283157 A1 * | 11/2009 | Hogan | ........................... | 137/542 |

* cited by examiner

*Primary Examiner* — John Rivell
*Assistant Examiner* — R. K. Arundale
(74) *Attorney, Agent, or Firm* — Leong C. Lei

(57) ABSTRACT

A pressure relief valve comprising a tubular main body with a pressure relief perforation, a pressure adjustor with an anti-leakage rubber and an anti-reverse member; wherein the main body further comprises air inlet and outlet, a channel between the inlet and outlet and with a through-hole penetrating the main body. The pressure adjustor is mounted on the through-hole and the anti-reverse member is mounted on the outlet. As the inlet is connected to an air pump and the outlet is connected to a filling-article, a pressure value is preset with the pressure adjustor such that when the filling-article reaches the preset pressure value, the anti-reverse member engages the channel to move the anti-leakage rubber of the pressure adjustor upward and the air is released from the pressure release perforation in order to stably maintain the filling-article at an air-filling state within the preset pressure value.

3 Claims, 6 Drawing Sheets

PRESSURE RELIEF VALVE

TECHNICAL FIELD OF THE INVENTION

The present invention is related to an improved pressure relief valve, in particular, to an improved pressure relief valve provided for connection with an air pump and a filling-article filled with air, which allows the setting of the pressure value of the filling-article such that when the filling-article reaches a preset pressure value, the air can be released from the main body of the pressure relief valve in order to stably maintain the air-filling status of the filling-article at the preset pressure value.

DESCRIPTION OF THE PRIOR ART

Conventionally, as filling-articles of tires of vehicles including such as bicycles are to be pumped with air, an air pump is connected to the nozzle of the tire via a tube such that the air can be pumped into the tire with the air pump. Since the amount of the air pumped into the tire is related to the flexibility and strength of the tire, it is optimal to maintain a proper air pressure of the tire with an adequate amount. However, the pressure values of the tires cannot be readily apparent from the outer appearance after the pumping of the air into the tires and users are often required to check the pressure value thereof with the a hand touch or with the use of a pressure reader positioned at the nozzle in order to obtain the pressure value, which is inconvenient to the users during such operations and processes. After years of research and development, the inventor provides an improved pressure relief valve in light of overcoming the drawbacks of known relieve valves such that the improved pressure relief valve is able to allow air exceeding the preset pressure value to be released from the pressure relief perforation as the air pressure of the filling-article reaches the preset pressure value in order to stably maintain the filling-article at an air-filling state within the preset pressure value and such that the operation of air filling can be facilitated and can be more convenient to the users.

SUMMARY OF THE INVENTION

In view of the abovementioned drawbacks associated with the known arts, a primary objective of the present invention is to provide an improved pressure relief valve to be connected to an air pump for air filling into a filling-article such as tires such that the pressure value of the filling-article can be preset with the pressure adjustor and such that as the air pressure of the filling-article reaches said preset pressure value, air exceeding said preset pressure value is released from the pressure relief perforation of the main body in order to stably maintain the filling-article at an air-filling state within the preset pressure value.

To achieve the abovementioned objective, the present invention provides an improved pressure relief valve comprising a main body with a tubular shape, a pressure adjustor with an anti-leakage rubber and an anti-reverse member; and wherein the main body further comprises an air inlet, an air outlet and a channel with a smaller diameter provided between the air inlet and the air outlet. The channel comprises a through-hole penetrating through the main body such that the pressure adjustor is mounted onto the through-hole and the anti-reverse member is mounted onto the air outlet. According to such configuration and during an operation of the pressure relief valve, the air inlet of the main body is connected to an air pump and the air outlet is connected to a filling-article, and a pressure value of the filling-article is preset with the pressure adjustor. When the pressure value of the filling-article reaches the preset pressure value, excess pressure forces the anti-leakage rubber of the pressure adjustor to move upward for a top engagement thereof in order to allow the air exceeding the preset pressure value to be released from the pressure relief perforation of the main body. During the release of the pressure, the anti-reverse member engages and abuts the channel of the main body to form an anti-reverse engagement in order to stably maintain the filling-article at an air-filling state within the preset pressure value.

According to the abovementioned improved pressure relief valve, wherein the channel of the main body comprises a slanted section with a conical shape provided at the air outlet thereof, and said anti-reverse member comprises a shaft mounted onto and penetrating through an elongated slat; and wherein the elongated slat is mounted onto the air outlet and another end of the shaft comprises a conical body having an O-shaped ring provided thereon; and wherein a spring is provided between the conical body and the elongated slat to position the shaft and to allow the anti-reverse member to be moveable such that the conical body is able to either block the channel or disengage from the channel in order to form an air-filling engagement or an anti-reverse engagement.

DETAILED DESCRIPTION OF THE PREFERRED EMBODIMENTS

Figure 1:
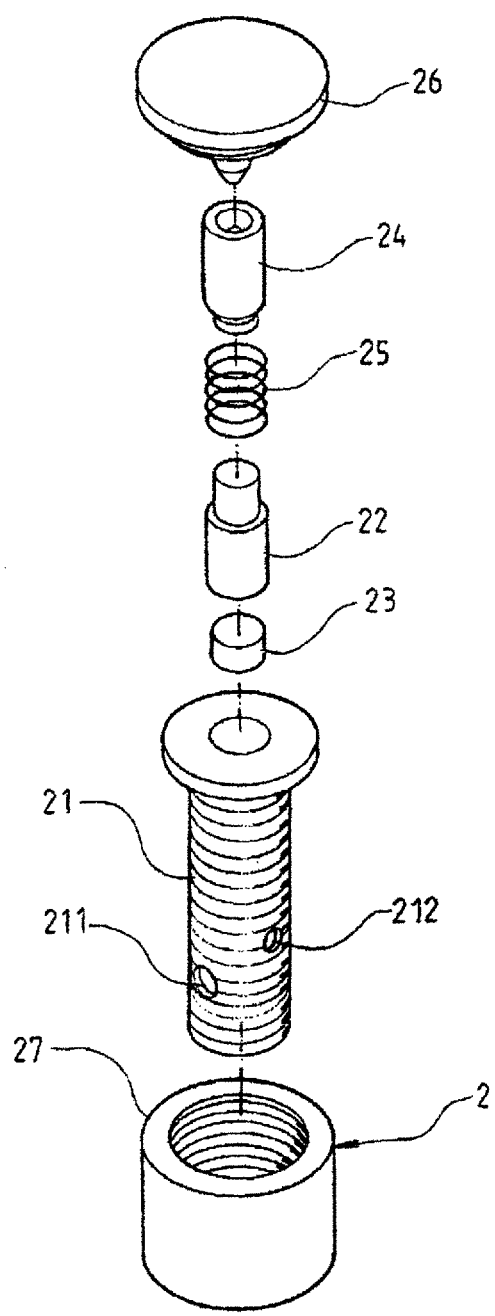
FIG. 1 is an exploded view of the present invention.
Figure 2:
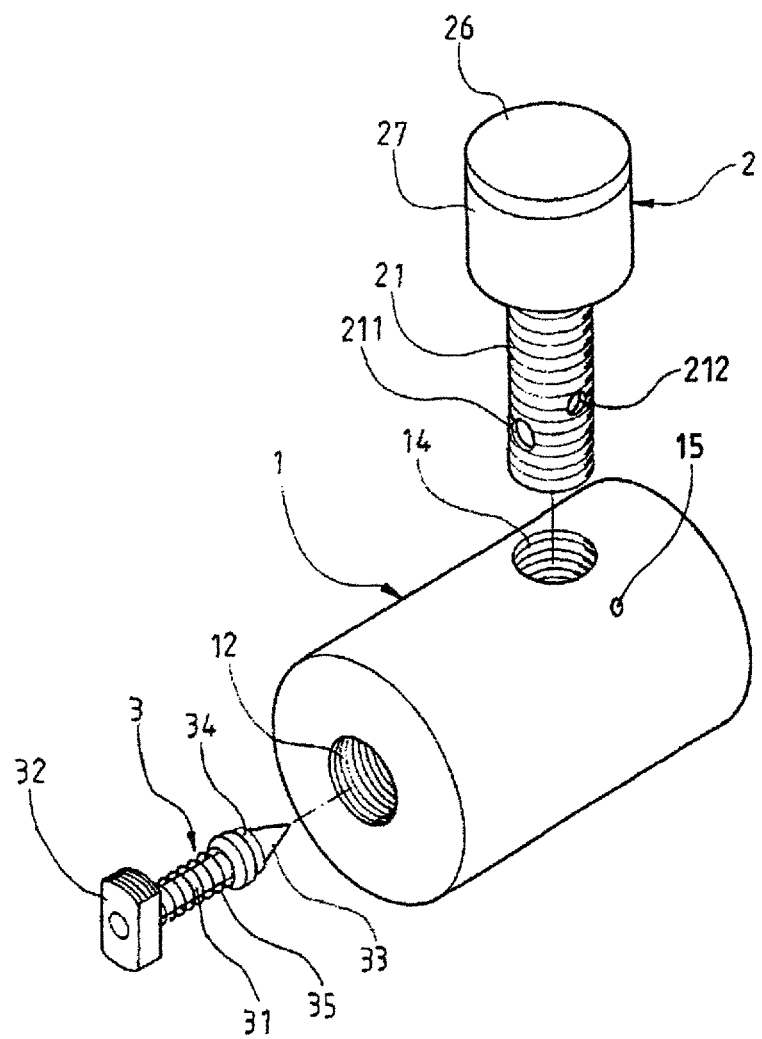
FIG. 2 is another exploded view the present invention.
Figure 3:
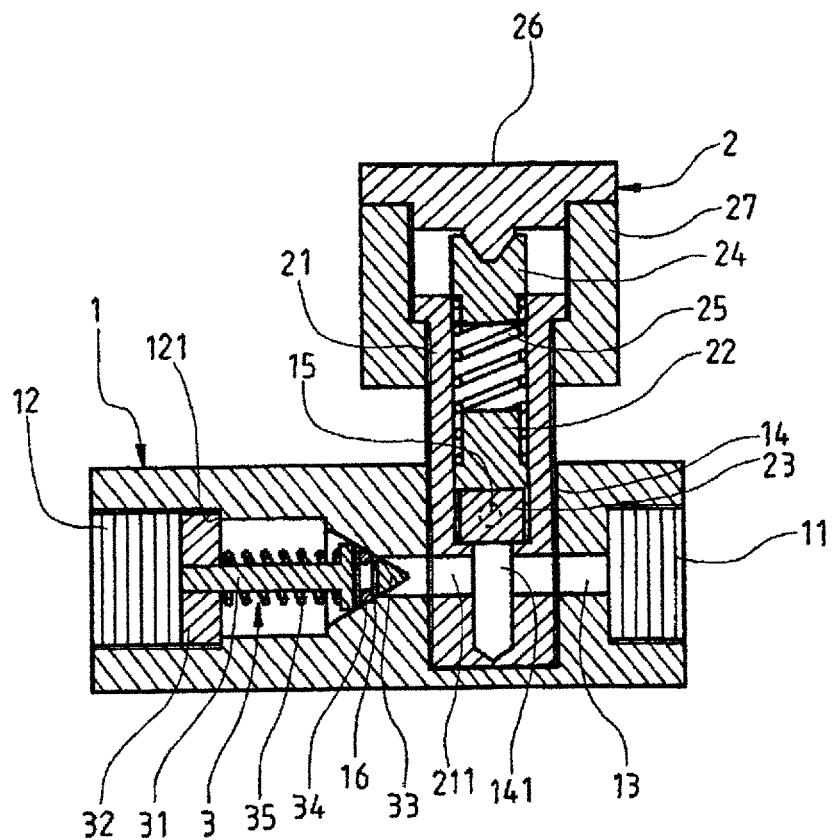
FIG. 3 is a cross sectional view of the present invention.

In accordance with the accompanied drawings disclosed, FIG. 1 is an exploded view of the present invention, FIG. 2 is another exploded view of the present invention and FIG. 3 is a cross sectional view of the present invention. The present invention provides an improved pressure relief valve comprising a main body 1 with a tubular shape, a pressure adjustor 2 and an anti-reverse member 3; wherein the main body 1 comprises an air inlet 11 and an air outlet 12 provided on two ends thereof, a staged portion 121 provided on a predefined location of the air outlet 12 and a channel 13 with a smaller diameter provided between the air inlet 11 and the air outlet 12. In addition, the channel 13 comprises a through-hole 14 penetrating through the main body. The through-hole 14 comprises a pressure relief perforation 15 penetrating through a wall of the main body 1. Furthermore, the connecting ends of the channel 13 and the air outlet 12 are provided with slanted sections 16 having a conical shape.

The abovementioned pressure adjustor 2 comprises a sleeve 21 having a guiding hole 211 and a leakage-directing hole 212 provided at a predefined location thereon and penetrating through the sleeve 21 and an air conduit 141 fluidly connected to the guiding hole 211. The sleeve 21 also comprises a securement base 22 provided therein, an anti-leakage rubber 23 mounted at a bottom of the securement base 22; a top-engagement base 24 provided on a top of the securement base 22 and a spring 25 provided between the top-engagement base 24 and the securement base 22. The top-engagement base 24 comprises a label disk 26 mounted thereon and the label disk 26 is further secured onto an adjustment base 27; and wherein the adjustment base 27 is secured onto the sleeve 21 and the sleeve 21 is secured onto the through-hole 14 of the main body such that the guiding hole 211 of the sleeve 21 is fluidly connected to the channel 13 and such that the leakage-directing hole 212 is fluidly connected to the pressure relief perforation 15 of the main body 1.

The abovementioned anti-reverse member 3 comprises a shaft 31 mounted onto and penetrates through an elongated slat 32; wherein the elongated slat 32 is mounted onto the air outlet 12 of the main body and comprises a staged portion 121 to form positioning thereof and to prevent over insertion into the air outlet 12. Another end of the shaft 31 comprises a conical body 33 having an O-shaped ring 34 provided thereon, and a spring 35 is provided between the conical body 33 and the elongated slat 32 in order to position the shaft 31 and to allow the anti-reverse member 3 to be moveable.

According to the abovementioned structural configuration of the improved pressure relief valve and during an operation of said pressure relief valve, the air inlet 11 of said main body 1 is connected to an air pump and the air outlet 12 is connected to a filling-article of, for example, a tire, and a pressure value of said filling-article is preset with said pressure adjustor 2. Under a normal condition, the anti-leakage rubber 23 of the pressure adjustor 2 blocks the top opening of the air conduit 141 of the main body 1 due to the downward force exerted by the spring 25 and the securement base 22 in order to force air from the air pump to push the anti-reverse member 3 toward the air outlet 12 and to form an adequate gap allowing air to pass through the anti-reverse member 3 and to fill up the filling-article. Furthermore, as the filling-article reaches said preset pressure value, excess air being pumped from said air inlet 11 forces the securement base 22 of the pressure adjustor 2 and the anti-leakage rubber 23 to move upward for an upward engagement such that, during which, the anti-leakage rubber 24 disengages from the air conduit 141 to allow air to be released from the leakage-directing hole 212 of the sleeve 21 via the pressure relief perforation 15 of the main body 1. In addition, during the time when the air is released from the pressure relief perforation 15 of the main body 1, the conical body 33 of the anti-reverse member 3 engages and abuts a slanted section 16 of the channel 13 of the main body 1 due to the forces of the pressure release and the spring 35 to form an anti-reverse engagement or effect in order to stably maintain said filling-article at an air-filling state within said preset pressure value.

Figure 4:
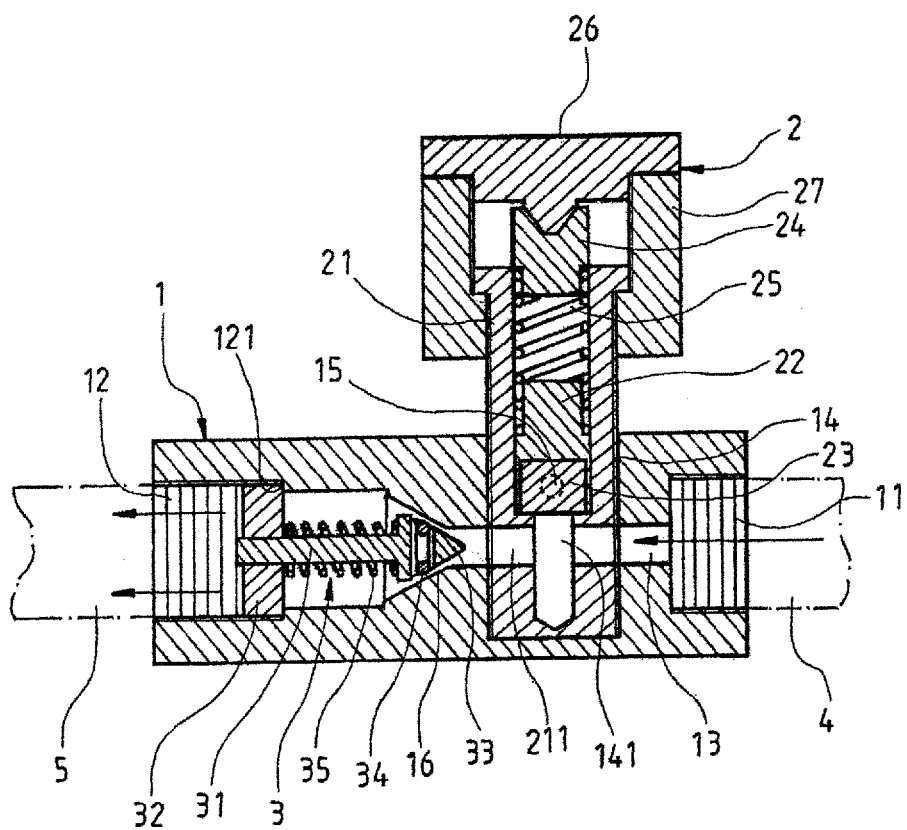
FIG. 4 is an illustration showing the air-filling embodiment of the present invention.

Please refer to FIG. 4 showing an illustrative air-filling embodiment of the present invention. As shown in the figure, during an operation of the present invention, the air inlet 11 of the main body 1 is connected to an air pump with a pipe 4 and the air outlet 12 is connected to a filling-article such as a tire with a pipe 5; and wherein the pressure value of the filling-article is preset with the adjustment base 27 of the pressure adjustor 2. Under a normal condition, the anti-leakage rubber 23 of the pressure adjustor 2 blocks the air conduit 141 of the main body 1 due to the downward spring force of the spring 25 to allow the air generated by the air pump to pass directly through the channel 13 and to push the anti-reverse member 3 toward the air outlet 12 such that the conical body 33 is disengaged from the slanted section 16 of the channel 13 to form an adequate gap. Given the existence of such adequate space between the circumference of the elongated slat 32 of the anti-reverse member 3 and the air outlet 12, the air is allow to pass through the anti-reverse member 3 and the space formed between the elongated slat 32 and the air outlet 12 in order to achieve the air-filling of the filling-article with the air from the air outlet 12.

Figure 5:
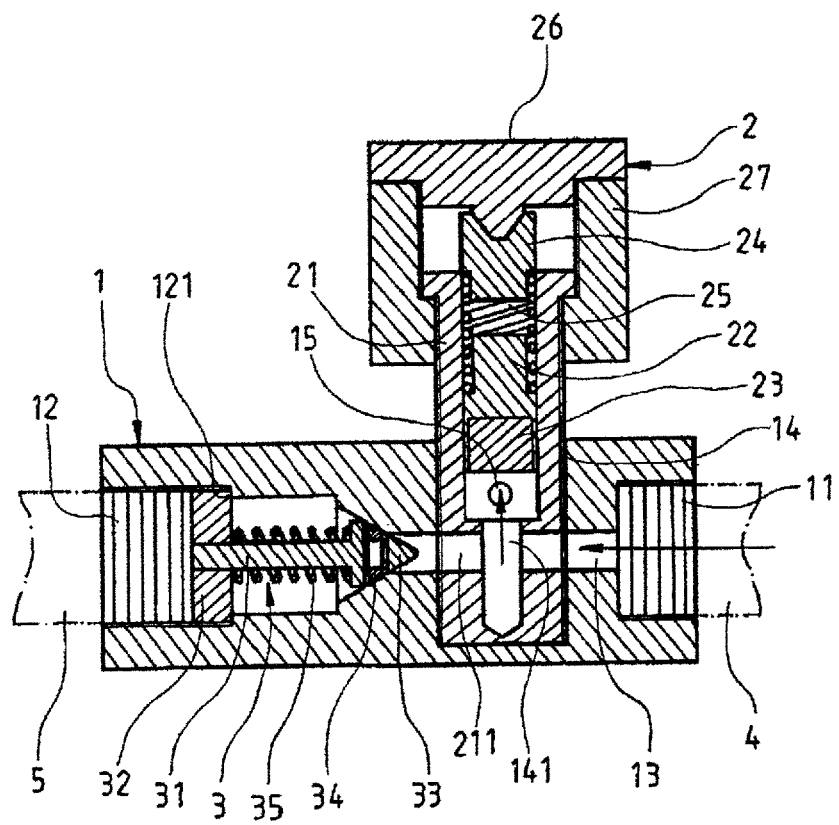
FIG. 5 is an illustration showing the pressure-release embodiment of the present invention.

Please refer to FIG. 5 showing an illustrative pressure-release embodiment of the present invention. As shown in the figure, as the filling-article reaches the preset pressure value, the excess air being pumped from the air inlet 11 forces the securement base 22 of the pressure adjustor 2 and the anti-leakage rubber 23 to move upward for an upward engagement and to force the anti-leakage rubber 23 to disengage from the air conduit 141 such that the air is released from the leakage-directing hole 212 of the sleeve 21 via pressure relief perforation 15 of the main body 1. During the time when the air is released from the pressure relief perforation of the main body 1, the conical body 33 of the anti-reverse member 3 engages and abuts the slanted section 16 of the channel 13 of the main body 1 due to the forces of the pressure release and the spring 35 in order to stably maintain the filling-article to be at an air-filling state within said preset pressure value.

Figure 6:
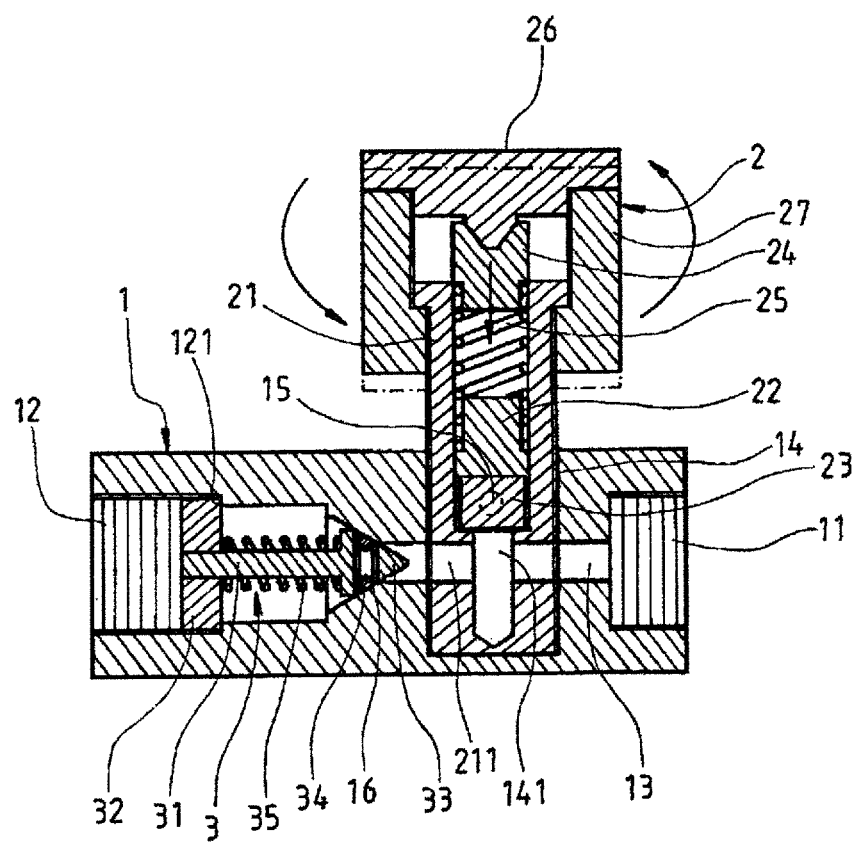
FIG. 6 is an illustration showing the pressure-adjustment embodiment of the present invention.

Please refer to FIG. 6 showing an illustrative pressure-adjustment embodiment of the present invention. As shown in the figure, the improved pressure relief valve of the present invention is able to properly adjust the amount of the pressure release based on the pressure required by the filling-article. For an adjustment of the present invention, the adjustment base 27 can be properly rotated in either a clockwise or a counterclockwise direction, and during the rotation thereof, the top-engagement base 24 is moved upward or downward such that the force applied to the securement base 22 can be altered via the spring 25 in order to achieve the adjustment of the pressure value and to achieve the effects of pressure release under different conditions of pressures. In addition, the amount and value of the adjustment can be viewed and read from the label disk 26.

The abovementioned embodiments of the present invention are provided for illustrative purposes only to demonstrate the best mode of the present invention; therefore, it can be understood that they shall not be treated as limitations to the present invention. Any modification and changes to the above shall be considered to be within the scope of the present invention without deviating from the spirit of the present invention.

In view of the above, the structural configuration of the improved pressure relief valve of the present invention comprising the tubular main body and the pressure adjustor as well as the anti-reverse member is advantageously provided for connection with an air pump and a filling-article for an air-filling thereof such that when the filling-article is saturated, the air can be released from the pressure relief perforation in order to prevent over filling of the filling-article and to protect it from further damage as well as to facilitate the filling operation thereof with greater ease and convenience.

What is claimed is:

1. An improved pressure relief valve, comprising:
   a main body with a tubular shape and comprising an air inlet and an air outlet provided on two ends thereof, a channel with a smaller diameter provided between said air inlet and said air outlet; said channel comprising a through-hole penetrating through said main body; and said through-hole comprising a pressure relief perforation penetrating through a wall of said main body;
   a pressure adjustor comprising a sleeve; said sleeve comprising a guiding hole and a leakage-directing hole penetrating therethrough and an air conduit fluidly connected to said guiding hole; said sleeve further comprising a securement base provided therein; an anti-leakage rubber mounted at a bottom of said securement base; a top-engagement base provided on a top of said securement base; a spring provided between said top-engagement base and said securement base; said top-engagement base comprising a label disk mounted thereon and further secured onto an adjustment base; said adjustment base secured onto said sleeve; and said sleeve secured onto said through-hole of said main body;

an anti-reverse member, comprising a shaft mounted onto and penetrating through an elongated slat; said elongated slat mounted onto said air outlet of said main body; another end of said shaft comprising a conical body having an O-shaped ring provided thereon; a spring provided between said conical body and said elongated slat in order to position said shaft and to allow said anti-reverse member to be moveable;

whereby, during an operation of said pressure relief valve, said air inlet of said main body is connected to an air pump and said air outlet is connected to a filling-article of a tire; a pressure value of said filling-article is preset with said pressure adjustor; and under a normal condition, said anti-leakage rubber of said pressure adjustor blocks said air conduit of said main body in order to force air from said air pump to push said anti-reverse member toward said air outlet and to form an adequate gap allowing air to pass therethrough and to fill up said filling-article; and whereby when said filling-article reaches said preset pressure value, air pumped from said air inlet forces said securement base of said pressure adjustor and said anti-leakage rubber to move upward for an upward engagement such that said anti-leakage rubber disengages from said air conduit to allow air to be released from said pressure relief perforation of said main body; and whereby said conical body of said anti-reverse member engages a slanted section of said channel of said main body to form an anti-reverse engagement in order to stably maintain said filling-article at an air-filling state within said preset pressure value.

2. The improved pressure relief valve according to claim 1, wherein connecting ends of said channel and said air outlet are provided with slanted sections having a conical shape to facilitate an engagement with said conical body of said anti-reverse member.

3. The improved pressure relief valve according to claim 1, wherein said air outlet of said main body comprises a staged portion at a predefined location thereon to prevent an over intrusion of said elongated slat into said air outlet.

* * * * *